No. 680,541. Patented Aug. 13, 1901.
O. OHLSSON.
AUTOMATIC SHAFT COUPLING DEVICE.
(Application filed Sept. 24, 1900.)
(No Model.) 2 Sheets—Sheet 1.
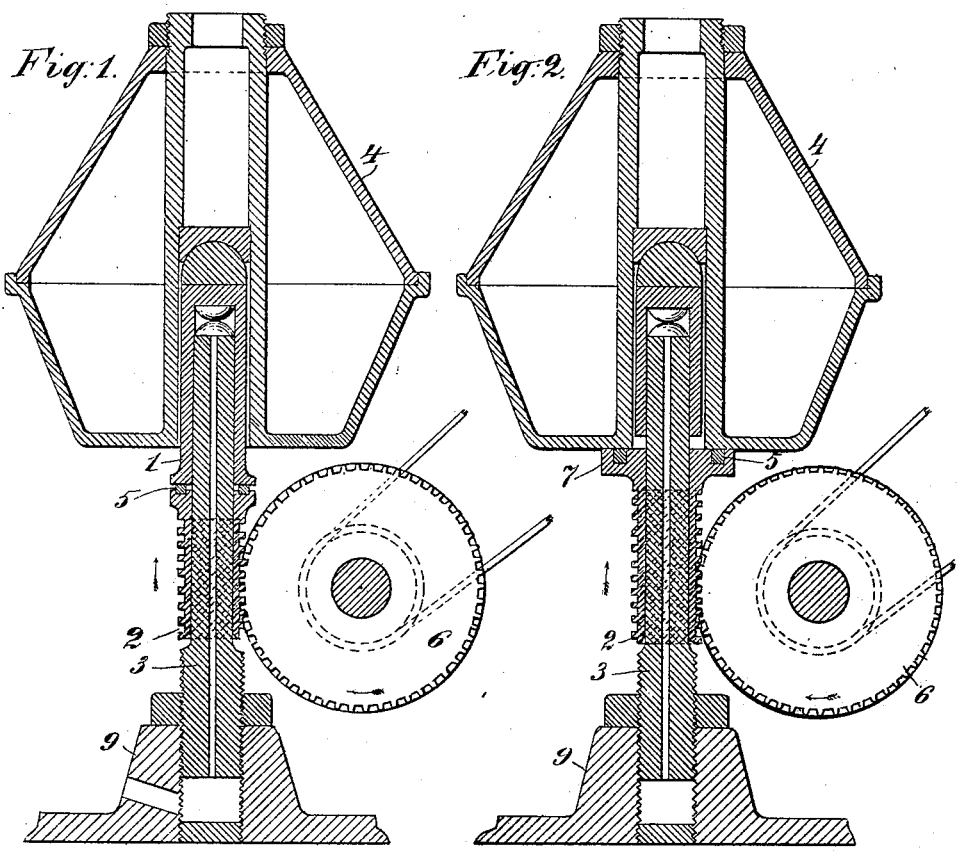
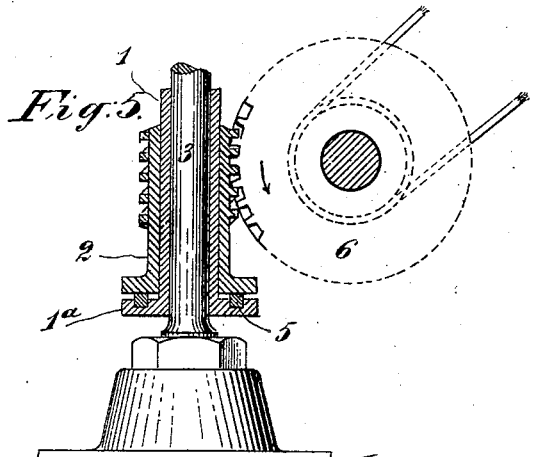
WITNESSES:
INVENTOR
Olof Ohlsson
BY
ATTORNEY No. 680,541. Patented Aug. 13, 1901.
O. OHLSSON.
AUTOMATIC SHAFT COUPLING DEVICE.
(Application filed Sept. 24, 1900.)
(No Model.) 2 Sheets—Sheet 2.
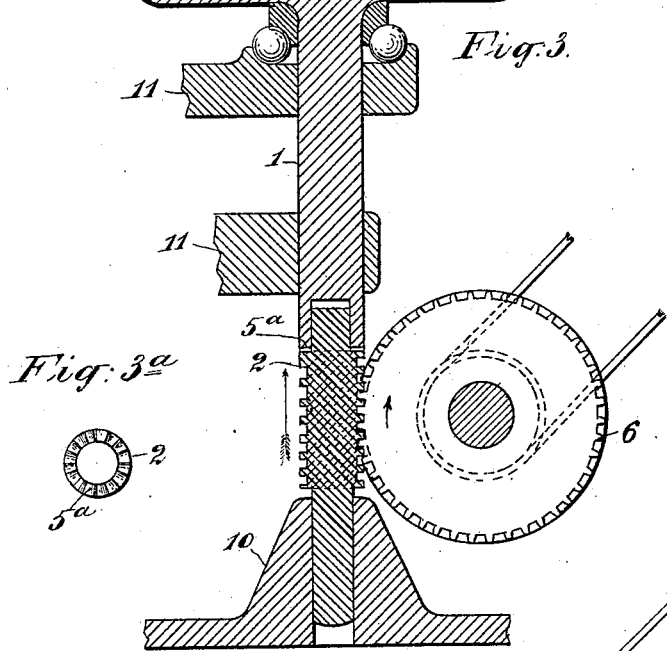
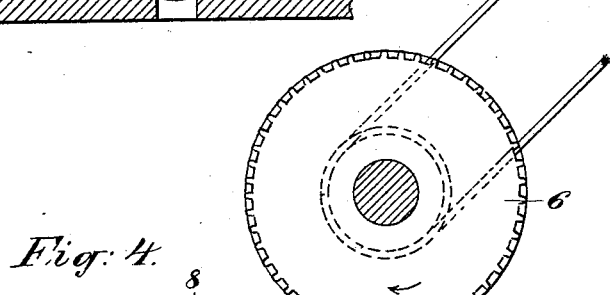
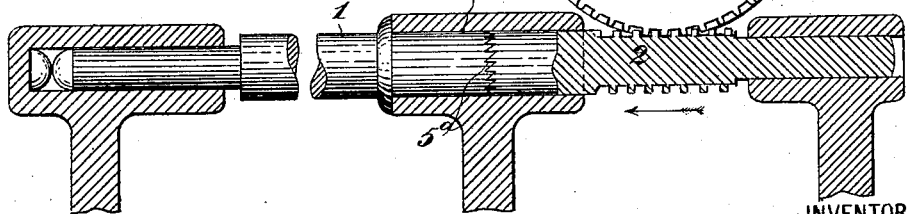
WITNESSES: INVENTOR
Olof Ohlsson
BY
ATTORNEY

UNITED STATES PATENT OFFICE.

OLOF OHLSSON, OF SÖDERTELJE, SWEDEN.

AUTOMATIC SHAFT-COUPLING DEVICE.

SPECIFICATION forming part of Letters Patent No. 680,541, dated August 13, 1901.

Application filed September 24, 1900. Serial No. 30,945. (No model.)

*To all whom it may concern:*

Be it known that I, OLOF OHLSSON, a citizen of the United States, residing at Södertelje, in the Kingdom of Sweden, have invented certain new and useful Improvements in Automatic Couplings, of which the following is a specification.

This invention relates to couplings for alined parts, such as shafts, and has for its object to effect the coupling automatically by shifting or moving endwise the rotating driven shaft or part.

As herein illustrated in the principal figures of the drawings, the invention is represented as applied to the upright shaft of a centrifugal machine, wherein the driven shaft is tubular or sleeve-like, and in the nature of a steep-pitched many-threaded screw, which is driven upward and coupled or clutched to the shaft or stem of the drum of the machine or to the drum itself by the automatic action of the driving worm-wheel. In fact these two parts form what are commonly known as "spiral gears."

In the drawings which illustrate embodiments of the invention, Figure 1 is a vertical axial section of the device wherein the drum of a centrifugal machine is balanced on and carried by a shaft which is actuated by the driven shaft through a coupling connection. Fig. 2 is a similar view showing the clutch or coupling device on the rotating or driven shaft bearing directly on the drum. Fig. 3 is a similar view to Fig. 1, but showing the drum having a stem provided with a toothed clutch member adapted to interlock with a corresponding clutch member on the driven shaft; and Fig. 3$^a$ is a face view of one of the clutch members. Fig. 4 shows the application of the invention to ordinary horizontal alined shafts. Fig. 5 illustrates a slight modification.

Referring primarily to Fig. 1, 1 is a tubular or sleeve-like shaft to carry the drum, and 2 is a sleeve-like driving part or shaft. These shafts are axially alined and both rotate on an upright spindle 3, fixed in a suitable base. The drum 4 is mounted on the upper end of the shaft 1 in a known way. The shaft 2 is capable of sliding longitudinally for a limited distance on the spindle 3, and in its upper end is mounted a ring or block 5, of rubber or the like, to bear on the lower end of the shaft 1 and form a friction coupling or clutch, whereby the shaft 2 drives the shaft 1 alined with it. The shaft 2 has on its exterior surface a steep-pitched multiple-threaded screw, which is engaged by or gears with oblique teeth on a wheel 6, whereby the shaft 2 is rotated.

The wheel 6 rotates in the direction of the arrow marked thereon, and in addition to its function of rotating the shaft 2 it also has the effect to lift up the said shaft and cause the frictional clutch-ring 5 to bear on the end face of the shaft 1, and thus couple the two shafts together frictionally, so that the shaft 2 drives the shaft 1. When the wheel 6 ceases to rotate, however, the shaft 2 is permitted to fall and release its frictional contact with the shaft 1 and allow the latter to be rotated independently. It will be noted that with this construction the coupling is effected automatically merely by the setting in motion of the wheel 6, and the shafts 1 and 2 are uncoupled automatically as soon as the wheel 6 ceases to rotate. The advantage of having the drum disengaged from the driving mechanism as soon as the latter ceases to run is known to all persons familiar with the operation of centrifugal machines.

The weight of the drum and its appurtenances on the shaft 1 suffices to resist the upward pressure of the shaft 2 when the machine is running, and it is not important to the invention just how the coupling device or clutch is constructed or its parts arranged. In the construction shown in Fig. 2 the rubber 5 on the upper end of the shaft 2 is so disposed as to bear directly on the under side or bottom of the drum 4 itself, being set in a flange 7 on the shaft 2. In Fig. 5 the shaft 2 is represented as a sleeve rotating freely on the shaft 1 and provided with screw-threads, as in Fig. 1, gearing with the teeth of the wheel 6. The shaft 1 has a flange 1$^a$ at its lower part, in which is set the rubber ring or block 5, and the lower end of the sleeve-like shaft presses down thereon. In this case the wheel 6 will of course rotate in a direction opposite to that seen in Fig. 1, or so that it will drive the shaft 2 downward. In Figs. 3 and 3$^a$ the clutch is a positive one, having teeth 5$^a$ on each member, which interlock when the parts are brought together.

In Fig. 3 the shaft 1 is represented as rigidly secured to the drum in the form of a pendent stem, the spindle 3 being omitted.

Fig. 4 shows the automatic coupling device applied to ordinary alined horizontal shafts, the adjacent ends of which are supported in a bearing 8. In this construction the coupling is effected in the same manner as has been described above; but when the motion of the wheel 5 ceases the uncoupling is effected by the continued rotation of the shaft 1, which causes the beveled faces of the clutch-teeth thereon to drive back the shaft 2 and effect the disengagement of the said teeth.

Obviously the invention described may be embodied in various forms without departing from my invention, and I do not limit myself to the specific constructions shown. Any construction wherein a rotatable shaft is slidable longitudinally into coupling connection with a rotatable alined part by the normal rotating action of a wheel which drives said slidable shaft would come within my invention.

The spindle 3 of Figs. 1 and 2 may be mounted in any suitable base or bed plate 9. In Fig. 3 the shaft 2 has a bearing below in the base 10 and the drum-shaft is supported in bearings 11, as clearly shown.

Having thus described my invention, I claim—

1. The combination with a rotatable part, a rotatable and longitudinally-slidable shaft alined axially with said part, and means for coupling said shaft to said part for driving when the shaft is pressed into contact with said rotatable part, of means for simultaneously rotating said shaft and moving it longitudinally into coupling contact with said rotatable part.

2. The combination with a rotatable part, a rotatable and longitudinally-slidable shaft alined axially with said part and having on it a steep-pitched screw-thread, and means for coupling said shaft to said part for driving when the shaft is pressed into contact with said rotatable part, of a rotating worm-wheel, the teeth of which engage the screw-thread on said slidable shaft, whereby the rotation of said wheel imparts rotation to said shaft about its axis, and simultaneously slides said shaft longitudinally.

3. The combination with a centrifugal drum, its shaft, and the rotatable shaft 2, alined with the drum-shaft, slidable endwise, and provided with oblique screw-threads, of the wheel 6, provided with oblique teeth engaging said screw-threads for driving, and the rubber coupling device 5, for coupling the two shafts together, substantially as set forth.

In witness whereof I have hereunto signed my name in the presence of two subscribing witnesses.

OLOF OHLSSON.

Witnesses:
ERNST SVANGVIST,
A. F. LUNDBORG.